(12) United States Patent
Carter

(10) Patent No.: US 8,978,125 B2
(45) Date of Patent: Mar. 10, 2015

(54) IDENTITY CONTROLLED DATA CENTER

(75) Inventor: Stephen R. Carter, Spanish Fork, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1466 days.

(21) Appl. No.: 11/583,667

(22) Filed: Oct. 19, 2006

(65) Prior Publication Data

US 2008/0098457 A1    Apr. 24, 2008

(51) Int. Cl.
*H04L 29/06* (2006.01)
*G06F 21/72* (2013.01)
*G06F 21/33* (2013.01)

(52) U.S. Cl.
CPC ............... *G06F 21/72* (2013.01); *G06F 21/33* (2013.01); *G06F 2221/2103* (2013.01)
USPC .......................................................... 726/10

(58) Field of Classification Search
CPC .. G06F 21/72; G06F 21/33; G06F 2221/2103
USPC .......................................................... 726/10
See application file for complete search history.

(56) References Cited

U.S. PATENT DOCUMENTS

| | | |
|---|---|---|
| 5,619,657 A | 4/1997 | Sudama et al. |
| 5,684,950 A | 11/1997 | Dare et al. |
| 5,832,487 A | 11/1998 | Olds et al. |
| 6,014,667 A | 1/2000 | Jenkins et al. |
| 6,157,925 A | 12/2000 | Jenkins et al. |
| 6,778,498 B2 | 8/2004 | McDysan |
| 6,829,654 B1 | 12/2004 | Jungck |
| 7,058,720 B1 | 6/2006 | Majidimehr |
| 7,117,535 B1 | 10/2006 | Wecker |
| 7,496,757 B2 | 2/2009 | Abbott et al. |
| 7,685,206 B1 * | 3/2010 | Mathew et al. ............... 707/785 |
| 7,698,400 B1 * | 4/2010 | Beloussov et al. ............ 709/223 |
| 7,793,101 B2 | 9/2010 | Wipfel et al. |

(Continued)

FOREIGN PATENT DOCUMENTS

| | | |
|---|---|---|
| EP | 1484890 A2 | 12/2004 |
| GB | 2387678 A | 10/2003 |

(Continued)

OTHER PUBLICATIONS

"European Patent Application Serial No. 07117394.2-122 1914658, Extended European Search Report dated Aug. 25, 2008", 9 pgs.

(Continued)

*Primary Examiner* — Jeffrey D Popham
(74) *Attorney, Agent, or Firm* — Osha Liang LLP

(57) ABSTRACT

Techniques for identity controlled data centers are provided. Remote processing environments are authenticated via identity associations. Virtual remote processing environments are subsequently installed and authenticated on the remote processing environments on which they are deployed and they receive unique virtual remote processing environment identities, which are locally and independently assigned within their remote processing environments. Applications deployed to the virtual remote processing environments are also authenticated and acquire identities for the virtual remote processing environments in which they are deployed. The processing of the remote virtual processing environments and the applications are circumscribed by independently acquired policies within the remote processing environments.

8 Claims, 6 Drawing Sheets

(56) References Cited

U.S. PATENT DOCUMENTS

| | | |
|---|---|---|
| 2002/0075306 A1 | 6/2002 | Thompson et al. |
| 2002/0138666 A1 | 9/2002 | Fujisawa |
| 2003/0088574 A1 | 5/2003 | White et al. |
| 2004/0001490 A1 | 1/2004 | Shima |
| 2004/0122931 A1* | 6/2004 | Rowland et al. ............... 709/223 |
| 2004/0230799 A1* | 11/2004 | Davis ............................ 713/169 |
| 2004/0259277 A1 | 12/2004 | Hofmeister |
| 2005/0246708 A1 | 11/2005 | Turner et al. |
| 2005/0289471 A1 | 12/2005 | Thompson et al. |
| 2006/0050888 A1 | 3/2006 | Svensson |
| 2006/0144927 A1 | 7/2006 | Love et al. |
| 2006/0155667 A1 | 7/2006 | Tolba |
| 2006/0200424 A1 | 9/2006 | Cameron et al. |
| 2006/0212934 A1 | 9/2006 | Cameron et al. |
| 2006/0233367 A1 | 10/2006 | Birrell et al. |
| 2007/0089111 A1 | 4/2007 | Robinson et al. |
| 2007/0094348 A1 | 4/2007 | Scheidel et al. |
| 2007/0239987 A1* | 10/2007 | Hoole et al. ................... 713/169 |
| 2008/0082600 A1* | 4/2008 | Meijer et al. ................... 709/201 |
| 2008/0082976 A1 | 4/2008 | Steinwagner et al. |
| 2008/0098392 A1 | 4/2008 | Wipfel et al. |
| 2008/0098462 A1 | 4/2008 | Carter |
| 2009/0064292 A1 | 3/2009 | Carter et al. |

FOREIGN PATENT DOCUMENTS

| | | |
|---|---|---|
| WO | 00/48063 A1 | 8/2000 |
| WO | WO-0069110 | 11/2000 |
| WO | 01/55819 A1 | 8/2001 |
| WO | WO-0182023 A2 | 11/2001 |
| WO | WO-02071191 A2 | 9/2002 |

OTHER PUBLICATIONS

"European Patent Application Serial No. 18102533.0, Extended European Search Report dated Jul. 3, 2008", 6 pgs.

Garfinkel, T., "Terra: A Virtual Machine-Based Platform for Trusted Computing", ACM SOSP. Proceedings of the ACM Symposium on Operating Systemsprinciples; Oct. 19, 2003, pp. 193-206, 14 pages.

European Search Report for Application Serial No. 14163998.9, dated Oct. 22, 2014, 9 pages.

U.S. Patent 5,373,559 issued Dec. 13, 1994 (17 pages).

\* cited by examiner

IDENTITY CONTROLLED DATA CENTER

FIELD

The invention relates generally to security and more particularly to techniques for identity controlled data centers.

BACKGROUND

Increasingly enterprises are attempting to utilize existing technology to conduct business and affairs in a remote and more automated manner. For example, enterprises are now capable of deploying software services to remote facilities or customers over the Internet.

One problem with seamlessly providing services over a network is that each service or package of services that is to be deployed has to be pre-configured for the physical environment in which the service will be installed. That is, the target physical environment may have a specific operating system, a specific file system, etc., such that the deployed service requires pre-configuration before it can be distributed and deployed in an automated manner on the target environment. This custom and often manual configuration negates many of the benefits associated with automated service deployment.

Another more pressing problem arises with respect to security. Enterprises do not want to deploy services on rogue environments and do not want their deployed services to be compromised for purposes of proliferating viruses or other harmful effects within legitimate environments. By automating distribution and deployment of services, the services naturally become targets of nefarious individuals that seek to compromise the services or use the services to their illegal advantages in some manner.

Consequently, enterprises have attempted to use a variety of conventional techniques to minimize their exposure when deploying services over the Internet. For example, the services may include digital certificates, digital signatures, and/or may be encrypted. Yet, keys often used for security measures may themselves be exposed on a network wire during a transaction and if they are not they still can be discovered within the target physical environment in which they are used. So, if a target physical environment becomes compromised by an intruder, then the physical environment's keys can likewise be compromised, at which point the physical environment and any deployed services can also be potentially compromised.

Moreover, for some industries, such as the banking industry, the federal government has promulgated rules and regulations that dictate a certain degree of security measures must be used. Thus, enterprises are not only concerned with their reputation and potential civil liability for security breaches but they are also concerned with violating federally mandated laws.

Consequently, what was considered a very valuable business model for an enterprise has now become administration and maintenance problem. Further, the costs associated with administering and maintaining security are passed onto the consumer in the prices associated with an enterprise's software services.

Thus, what is needed is a mechanism, which allows for the secure deployment of services in a more automated and secured manner from what has been achievable with existing approaches.

SUMMARY

In various embodiments, techniques for identity controlled data centers are provided. More specifically, and in an embodiment, a method is provided for establishing trust with a physical processing environment for use in deploying identity controlled data centers. Random data is sent to a remote identity service, which is associated with a remote processing environment. An encrypted version of the random data is received from the remote identity service and the encrypted version is decrypted to verify the random data. Next, a secure channel with the remote identity service is established when the encrypted version is verified. Furthermore, operating metadata unique to the remote processing environment is acquired via the secure channel and a unique identity for the remote processing environment is transmitted for subsequent authentication and deployment of policy restrictions within the remote processing environment.

DETAILED DESCRIPTION

Figure 1:
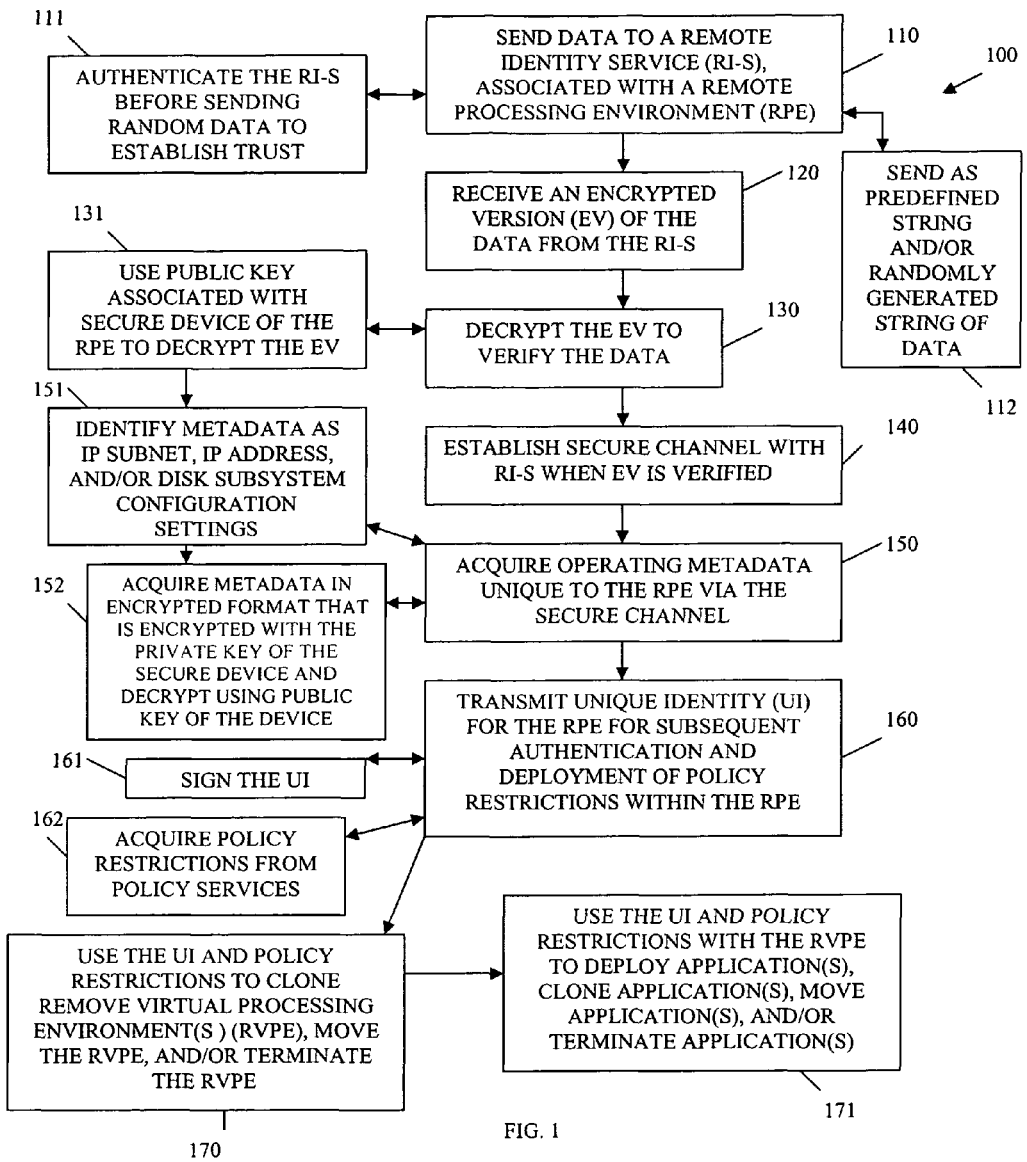
FIG. 1 is a diagram of a method for remotely establishing trust with a physical processing environment, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

The processing environments (physical and virtual) as used herein are configured to participate in a virtualized data center. A "virtualized data center" refers to a platform or environment for executing one or more similar services or applications. For example, an enterprise may deploy a suite of services for use, some of the service may be related to administration, audit tracking, security, maintenance, etc. of other ones of the deployed services. Thus, the platform or environment can include a variety of services, some of which may share features and some of which may be independent of the other services.

A "policy distribution decision point service" (PDP service) is a mechanism that accepts input parameters from a "policy enforcement point service" (PEP service). A "PEP service" is a mechanism that enforces each specific PDP service dispositions.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "temporary access token" as used herein refers to a temporary identity supplied to a resource for temporary use until a more permanent identity can be established. Furthermore, as used herein a "service provider" (SP) refers to a special type of service or resource that utilizes identities vended by a trusted identity service on behalf of other resources.

Finally, an "orchestration service" is another specialized resource or service that provides a mechanism for orchestrating the deployment, cloning, moving, terminating, etc. of virtual processing environments included within a physical processing environment.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-6.

FIG. 1 is a diagram of a method 100 for remotely establishing trust with a physical processing environment, according to an example embodiment. The method 100 (hereinafter "identity service") is implemented as instructions in a machine-accessible and readable medium. The instructions when executed by a machine perform the processing depicted in FIG. 1. The identity service is also operational over and processes within a network. The network may be wired, wireless, or a combination of wired and wireless.

As will be more fully described herein and below, the identity service permits a physical processing environment to be authenticated via an identity assignment and set up (via policy) for the dynamic deployment of virtual processing environments and applications that process within those virtual processing environments.

At 110, the identity service sends data to a remote identity service. The remote identity service is external to the local environment of the identity service. Moreover, the remote identity service resides within a physical processing environment that the identity service is attempting to establish trust with and attempt to supply a unique identity to. The identity service and the remote identity service are in a secure and trusted relationship with one another. Thus, at 111, before the identity service and the remote identity service begin to transact with one another the remote identity service is authenticated via any desired or configured technique.

According to an embodiment, at 112, the data sent may be from a variety of sources. For example, the data may be predefined strings that are acquired from a table. Alternatively, the data may be a randomly generated string. In fact, any data string of characters predefined, dynamically defined, or randomly generated may be sent from the identity service to the remote identity service, at 110.

At 120, the identity service receives back from the remote identity service an encrypted version of the data originally sent to it by the identity service. At 130, the identity service attempts to decrypt the encrypted version of the data for purposes of verifying that the physical processing environment is known to the identity service and can be supplied an identity to transact with the identity service and with other services.

According to an embodiment, at 131, the encryption may occur through the use of a private key, which is associated with a secure device located within the physical processing environment, where the remote identity service transacts. The secure device does not permit the private key to be read out of its device at all. So, the remote identity service has no knowledge whatsoever of the private key. The identity service is previously configured when the secure device is distributed to the physical processing environment to include the public key of the secure device.

The remote identity service receives the data from the identity service and passes it to the secure device. The secure device returns an encrypted version of the data to the remote identity service and the remote identity service forwards that via its secure communication channel to the identity service. The identity service uses its previously acquired public key for the secure device to decrypt the data and if the decrypted version of the data matches what the identity service initially sent, then the identity service is assured that the physical processing environment is who it purports to be or can be trusted because it knows the presence of the secure device is within that physical processing environment. Furthermore, the identity service also knows it is already in an authenticated and trusted relationship with the identity service that also resides within the physical processing environment. If the decrypted version does not match what was sent then processing concludes and reporting or logging mechanisms may be used to indicate a potential fraudulent attempt to establish trust from the physical processing environment with the identity service occurred.

Assuming the data is verified, at 140, the identity service may then establish a secure channel with the remote identity service for purpose of permitting the physical processing environment and its services to initially transact with the identity service and perhaps a sub set of other services that the identity service permits to transact with the physical processing environment.

Next, at 150, the identity service acquires operating metadata associated with the physical processing environment via the secure channel. The operating metadata may also be unique to the physical processing environment. In an embodiment, the identity service, at 151, may identify the metadata as such things as an Internet Protocol (IP) subnet for the physical processing environment, an IP address for the physical processing environment, disk or storage subsystem configuration settings for the physical processing environment, and the like.

Optionally, at 152, the metadata received from the physical processing environment may also be encrypted with the private key of the secure device that resides within the physical processing environment. Again, the remote identity service initially acquires the metadata and then passes it to the secure device and receives back an encrypted version that the remote identity service cannot decrypt but that the identity service can, as explained above. Also, at 152, the identity service may decrypt the encrypted metadata using the public key of the secure device in a manner similar to what was discussed above with respect to encrypted data returned from the remote identity service, which was encrypted by the secure device using its private key.

At 160, the identity service generates a unique identity for the physical processing environment and transmits that unique identity to the remote identity service. The unique identity may now be used by the physical processing environment and it agent services to transact with the identity service and with any other services authenticated to the identity service that the identity service permits via policy to transact with the now authenticated and trusted physical processing environment.

One such service that the identity service permits to communicate with the authenticated physical processing environment services is a PDP service. The PDP service permits policies to be dynamically distributed to the physical processing environment and to be dynamically enforced with respect to operations being installed and processed within the physical processing environment. Enforcement of the policies may occur via a PEP service installed on and operating within the physical processing environment. It is recognized that other services known to the identity service may transact pursuant to a trust specification and policy with the agents (services) of the authenticated physical processing environment.

In some cases, at 161, the unique identity supplied to the physical processing environment may be signed by the identity service before being distributed, by the secure device using its private key once received by the remote identity service, or by both the identity service and the secure device. Thus, the identity service or any of its delegated service may only recognize the distributed unique identity for the physical processing environment's agents when received for subsequent communication and authentication if it is signed. This adds an extra level of trust and security to transactions.

In an embodiment, at 162, the identity service may also acquire policy restrictions on behalf of the agents of the physical processing environment from one or more PDP services and distribute those via the secure channel to those agents for deployment and enforcement within the physical processing environment.

At this point, the identity service has established a unique identity for the physical processing environment via authentication in the manners discussed in detail above. This unique identity may now be beneficially used in combination with policy restrictions (as also discussed above), at 170, to distribute, clone, move, or terminate one or more virtual processing environments (discussed in more detail below with reference to FIGS. 3-6). Additionally, at 171, the unique identity and the policy restrictions may be beneficially used once a virtual processing environment is instantiated on the physical processing environment to deploy, clone, move, and terminate one or more applications executing within the virtual processing environment.

Figure 2:
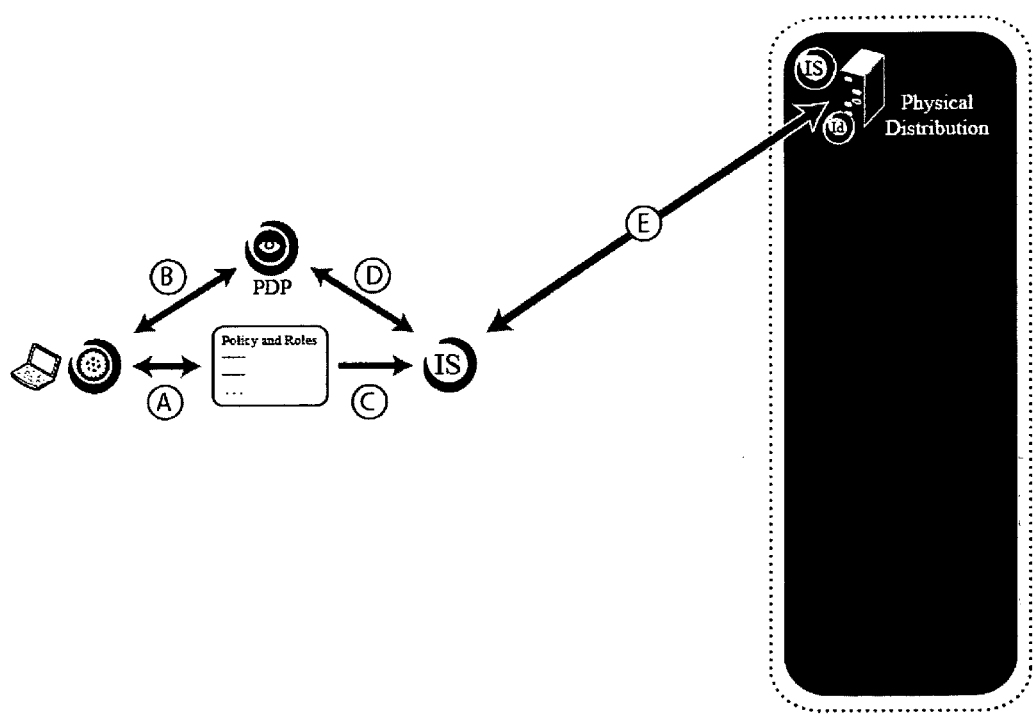
FIG. 2 is a diagram of example interactions for an architecture associated with the method depicted in FIG. 1, according to an example embodiment.

FIG. 2 is a diagram of example interactions for an architecture associated with the method depicted in FIG. 1, according to an example embodiment. The diagram includes a variety of resources and interactions that these resources have with one another for purposes of initially authenticating a physical processing environment and setting it up for subsequent deployment of virtual processing environments and applications that may execute within those virtual processing environments.

The components depicted on the left side of the FIG. 2 represent data center resources. One notable resource is labeled as "IS." This stands for "identity service" and may be viewed as performing the operations and processing discussed above with respect to the method 100 of the FIG. 1. Another data center resource is the PDP service, also discussed above with reference to the method 100 of the FIG. 1.

The components on the right side of the FIG. 2 represent resources that are contained within the physical processing environment. In the FIG. 2 the physical processing environment is labeled as "physical distribution." The phrase "physical processing environment" may be used interchangeably herein with the phrase "physical distribution." One notable resource of the physical distribution is the identity service it has identified again as "IS." This physical distribution identity service is the "remote identity service" discussed above with reference to the method 100 of the FIG. 1.

Interactions between the resources are labeled with uppercase alphabetic characters A-E. Initially, trust is established between the data center IS and the physical distribution's IS (remote IS with respect to the data center IS). Any authentication mechanism may be used to initially establish trust between the two identity services for initial and cursory communication.

Yet, trust with the physical processing environment as a whole or with its agents is not achievable at this point, since to establish trust it is desirable for the data center IS to have a private key known only to it and the physical processing environment. The problem is that if the physical processing environment retains its private key then it could be readout or compromised on by intruders on processing within the physical processing environment. To solve this situation, a secure device on the physical distribution holds the private key; the secure device's public key is known to the data center IS. The private key is not capable of being read out of or acquired in any manner from the secure device. Secure devices that can achieve this may use a specification defined as Trusted Platform Module (TPM).

The data center IS sends random characters to the physical distribution's IS. Those characters are passed to the secure device and encrypted with the private key. The encrypted characters are supplied to the physical distribution's IS and sent back to the data center IS. The data center IS decrypts using the associated public key for the secure device. If successful, a secure channel E is set up and trust is now established between the data center IS and the physical distribution via the physical distribution's IS.

Now E can be used to obtain other metadata from the physical distribution, such as IP subnet, IP address, disk subsystem configuration, CPU's, memory, etc. to determine further characteristics of authenticity of the physical distribution. Optionally, the metadata may be also encrypted with the private key of the secure device before being sent over E to from the physical distribution's IS to the data center IS.

The end result is that the information is received by the data center IS to allow the PDP and the physical distribution's IS to apply policy (via C and D) to provide the physical distribution with a unique identity. When the physical distribution gets the unique identity, it is signed by the secure device using its private key. This ensures that the unique identity cannot be used by another physical distribution. Thereafter, communication via E is optionally singed by both sides to verify that traffic is still coming from the trusted source and sink.

Figure 3:
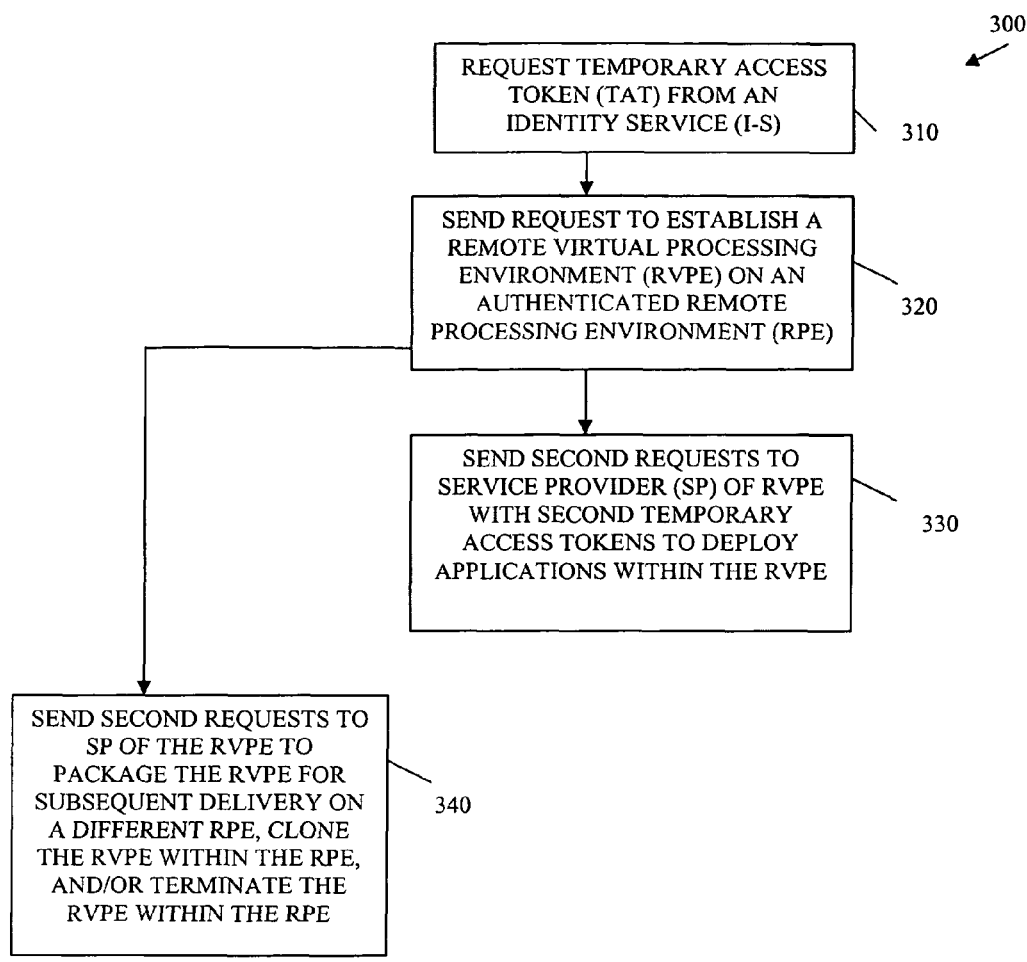
FIG. 3 is a diagram of method for remotely initiating a virtual processing environment within a physical processing environment, according to an example embodiment.

At this point the operations of another specialized resource are introduced with reference to FIG. 3, namely the orchestration service.

FIG. 3 is a diagram of method 300 for remotely initiating a virtual processing environment within a physical processing environment, according to an example embodiment. The method 300 (hereinafter "orchestration service" is implemented in a machine-accessible and readable medium as instructions. The instructions when executed by a machine perform the processing depicted in the FIG. 3. Moreover, the orchestration service is operational over a network, and the network may be wired, wireless, or a combination of wired and wireless.

The orchestration service complements and adds features and functions to what was described above with respect to the method 100 of the FIG. 1. Moreover, the orchestration service interacts with the identity service represented by the method 100 of the FIG. 1 in the manners described more completely below. The orchestration service is used to deploy, instantiate, clone, move, terminate, etc. virtual processing environments in authenticated and trusted physical processing environments (authenticated in the manner described in detail above with reference to the method 100 and the FIG. 1). The orchestration service is also used to deploy, instantiate, clone, move, terminate, etc. applications that execute within the virtual processing environments. As will be demonstrated, this is achieved by facilitating identity creation and authentication between a variety of resources so as to securely permit the management operations (deploying, cloning, moving, terminating, etc.) briefly discussed above.

Initially, the orchestration service obtains its own identity to establish communication and trust with the identity service of the data center, such as the identity service represented by the method 100 of the FIG. 1. At 310, the orchestration service then desires to instantiate a virtual processing environment (may also be referred to herein as a "virtual distribution" which is also remote from the orchestration service so it may also be referred to as a "remote virtual processing environment") in an authenticated physical distribution (remote and target processing environment). To do this, the orchestration service initially requests from the data center IS a temporary access token or temporary identity for the virtual distribution that is to be deployed in the target physical distribution.

The virtual distribution includes a specialized SP that the orchestration service uses to communicate with on the physical distribution. Before the virtual distribution can be initiated on the physical distribution, the orchestration service supplies it with the temporary access token acquired from the data center identity service. Thus, at 320, the orchestration service sends a request to establish the virtual distribution on the authenticated physical distribution and that request includes the temporary access token that the SP handles within the physical distribution to facilitate the request.

The SP within the physical distribution then passes the temporary access token to the physical distribution's IS (which is remote from the orchestration service). The physical distribution's IS then contacts the data center IS and verifies the temporary access token. If verified then physical distribution's IS inspects the rest of the virtual distribution's configuration and contacts a PDP service to have it validate the association between the physical distribution and the virtual distribution. If the association cannot be verified (i.e. subnet is wrong, etc.), then the SP is not supplied virtual distribution of virtual processing environment unique identity and an error is raised. If it is verified then the physical distribution's IS supplies the unique identity to the SP for the virtual distribution to process within the physical distribution.

At 330, the orchestration service may also send second requests to the SP of the remote physical distribution with additionally acquired temporary access tokens, which were similarly acquired from the data center IS. These second temporary access tokens are used to deploy applications into the remote virtual distribution and to acquire in a manner similar to what was discussed above unique application identities for the applications to use when processing with the remote virtual distribution.

According to an embodiment, at 340, the orchestration service may also send second requests to the SP of the remote physical distribution to package the remote virtual distribution for subsequent deployment on a different physical distribution. If this is done, then the configuration and state of the remote virtual distribution may be packaged, signed, and perhaps encrypted by the SP and supplied to the orchestration service. In other cases, the second requests sent to the SP may include instructions to move, clone, or even terminate the remote virtual distribution within the remote physical distribution.

More detailed processing associated with the SP and the physical distribution's IS is provided below with reference to the FIGS. 5 and 6.

Figure 4:
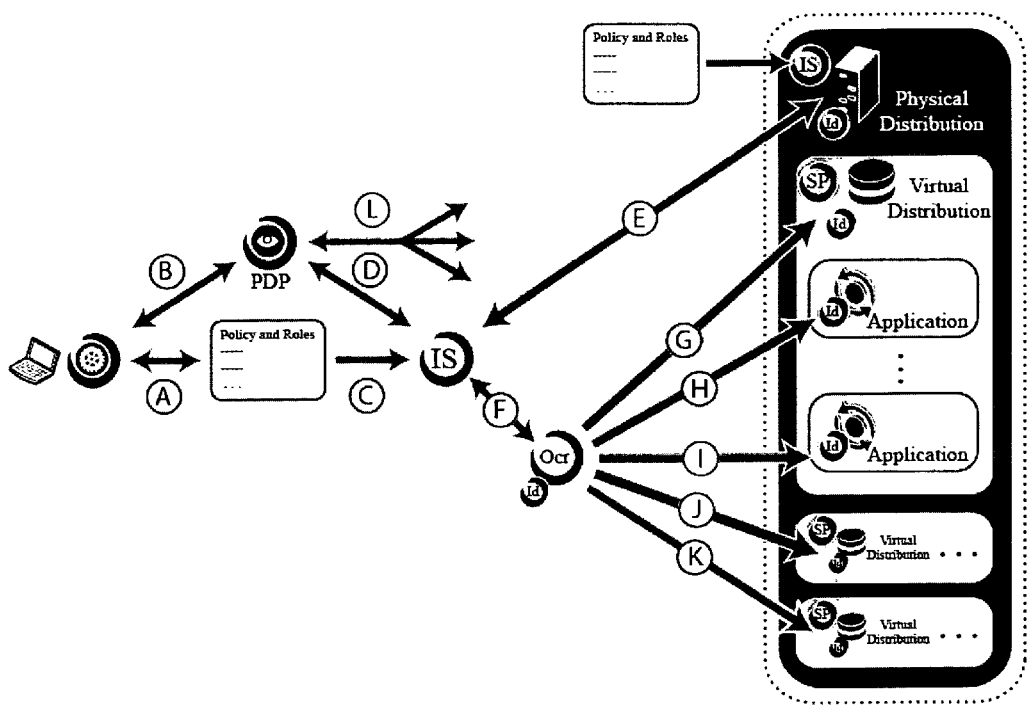
FIG. 4 is a diagram of example interactions for an architecture associated with the methods depicted in FIGS. 1 and 3, according to an example embodiment.

FIG. 4 is a diagram of example interactions for an architecture associated with the methods depicted in FIGS. 1 and 3, according to an example embodiment. The diagram includes a variety of resources discussed with the methods 100 and 300 of the FIGS. 1 and 3, respectively. Moreover, the diagram illustrated interactions that there resources have with one another to establish authentication and trust with one another via identity creation, management, and distribution. The resulting identity-based architecture permits virtual data centers to be dynamically distributed, cloned, moved, terminated, etc. within a physical processing environment.

Similar to the FIG. 2, the data center resources are depicted on the left hand side of the FIG. 4 and the physical distribution and its resources are depicted on the right hand side of the FIG. 4. The arrows show various interactions between the resources.

The resource within the data center labeled as "Ocr" is the orchestration service represented by the method 300 of the FIG. 3 and discussed above. The purpose of the orchestration service is to monitor the data center and deploy, instantiate, move, clone, etc. virtual distributions on physical distributions as per policy governing such. The governance of deployment, instantiation, etc. is handled by the orchestration service with policy enforcement achieved via novel identity creation, assignment, and management. The identity creation, assignment, and management are achieved in a cooperative manner by a variety of resources as discussed above and more completely below.

Initially, the orchestration service obtains is own identity via F from the data center IS. To initiate the virtual distribution, the orchestration service requests via F a temporary or short-lived token using its own trust initially established with the data center IS for the virtual distribution. That short-lived token is then supplied as part of the metadata associated with the SP of the virtual distribution. Next, using G, the orchestration service requests that a virtual distribution be initiated. At this point, the SP of the virtual distribution may be processed within the physical distribution as per policy associated with initial configuration of the physical distribution when it was authenticated by the data center IS and as was discussed above with reference to the method 100 of the FIG. 1.

The SP uses a local loopback address and port within the physical distribution to communicate the short-lived token included in its metadata to the physical distribution's IS. This process is entirely self-contained within the physical distribution. Thus assets and characteristics of the physical distribution are associated with the proposed virtual distribution. The physical distribution's IS then uses E to verify the short-lived token with the data center IS. This can be done in a variety of manners, such as but not limited to, Liberty Alliance IS proxy requests or via specific protocols to verify short-lived tokens.

If the short-lived token is validated then the physical distribution's IS inspects the rest of the virtual distribution's configuration and requests that a PDP via L validate the association of the physical and proposed virtual distribution. If the association cannot be validated then an error is raised or reported and the SP and virtual distribution are removed from the physical distribution. If the association is confirmed then the virtual distribution receives a unique virtual distribution identity within the physical distribution.

Also, if the association is confirmed then the full configuration of the virtual distribution is inspected to acquire specifications for applications that are allowed to run as part of the virtual distribution including such things as required subnet, list of specific physical distributions allowed to host the virtual distribution, etc. Next, the configuration is inspected by the physical distribution's IS (or agent that works with the physical distribution's IS) to verify nothing has been changed. In some cases, this may be validating a digital signature.

If all is well, each application of the virtual distribution is provided within an ID via the physical distribution's IS. Subsequently, if a rogue application is introduced into the running virtual distribution at a later date, such as a Trojan Horse, then it will not have a valid identity and will provide the physical distribution with information used to alert the orchestration service of a potential attack. If a virus is introduced within the physical distribution, the unique identity will not match the application signature (e.g., hash of a static portion of the authenticated application).

In another case, the orchestration service uses H to request the starting of a particular application and passes another or second short-lived token as part of the start request. The application configuration is verified and (assuming valid) the application is provided with a unique identity via the physical distribution's IS. Rogue applications or changes to a running application are again discovered because the application identity can no longer be verified because of the change. It is also noted that the PDP service can be accessed via L at any time.

FIG. 4 also illustrates that the orchestration service can be used to iteratively provide more application via I or more virtual distributions to the physical distribution via J and K. Note also that if a virtual distribution is to be moved from one physical distribution to another, the current configuration of the virtual distribution being moved (including run state) is packaged by the physical distribution, signed, and provided with another short-lived token from the orchestration service (resource requesting the move) and the signed package with the short-lived token is provided to the orchestration service. The mechanisms discussed above may then be used to introduce the packaged virtual distribution into another and different physical distribution, with policy also again fully enforced.

Figure 5:
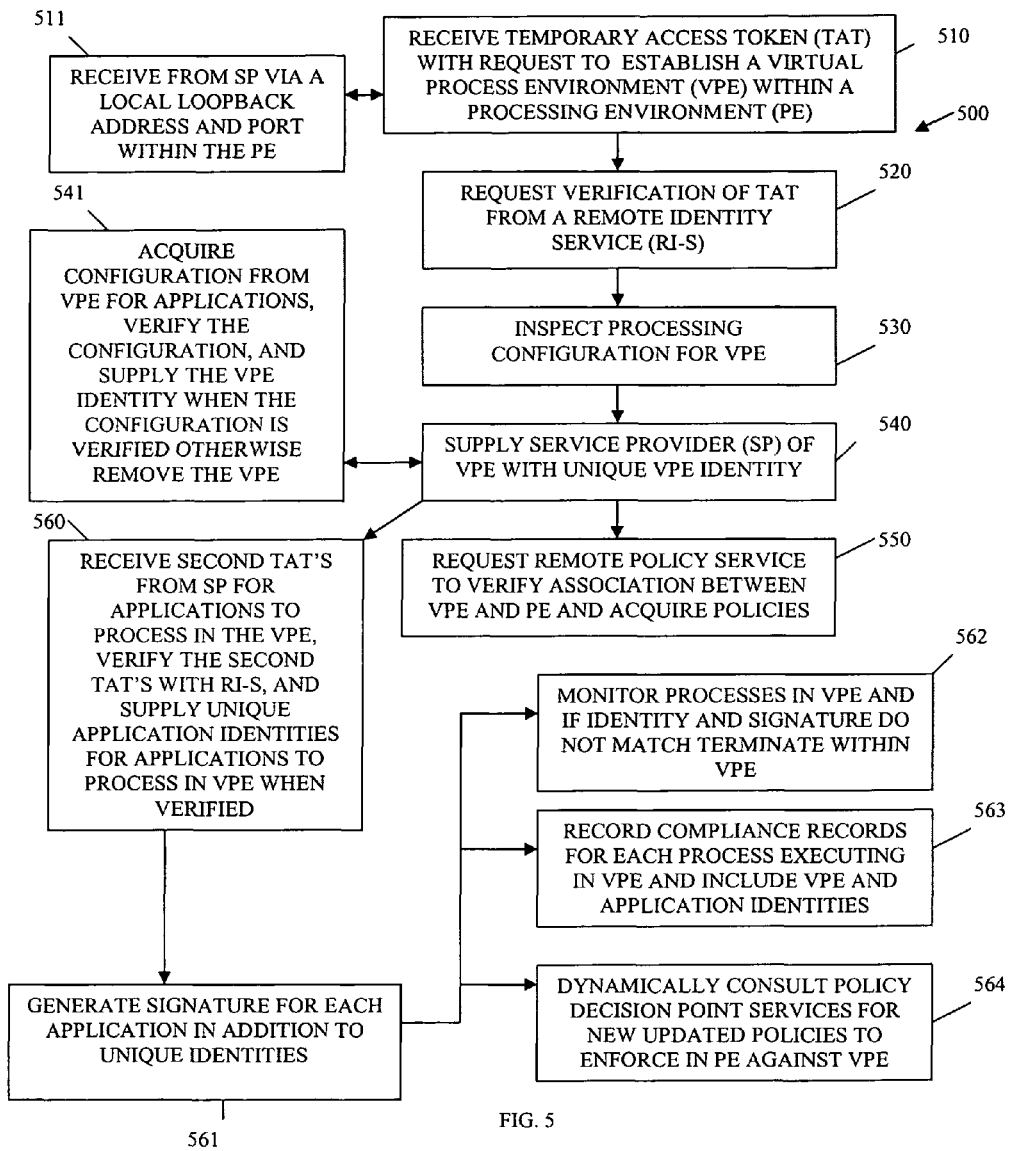
FIG. 5 is a diagram of a method for locally establishing trust for a virtual processing environment within a physical processing environment, according to an example embodiment.

FIG. 5 is a diagram of a method 500 for locally establishing trust for a virtual processing environment within a physical processing environment, according to an example embodiment. The method 500 (hereinafter "processing environment identity service") is implemented as instructions on or within a machine-accessible and readable medium. The instructions when executed by a machine performs the processing depicted in the FIG. 5. The processing environment identity service is operational over a network that may be wired, wireless, or a combination of wired and wireless. The processing environment identity service interacts with various physical processing environment and virtual processing environment services and also interacts with the identity service represented by the method 100 of the FIG. 1. The identity service represented by the method 100 of the FIG. 1 is considered herein to be "remote" to the processing environment identity service, which resides and is contained within the physical processing environment where virtual processing environments are managed.

As will be demonstrated herein the processing environment identity service, among other things, facilitates the distribution, creation, authentication, and management of identities within the physical processing environment and the virtual processing environments.

The method 100 described the processing associated with the data center's identity service; the method 300 described the processing associated with an orchestration service. The method 500 of the FIG. 5 describes the processing of the physical distribution's identity service referred to as the processing environment identity service with respect to the FIG. 5. The manner in which these resources interact with one another was described in detail above.

At 510, the processing environment identity service receives a temporary access token with a request to establish a virtual processing environment (virtual distribution) within a processing environment (physical distribution). The request is received via a SP associated with the virtual distribution. In an embodiment, the request is received as part of the metadata associated with the SP of the virtual distribution. In an embodiment, at 511, the processing environment identity service receives the temporary access token and the request from the SP via a local loopback address and port within the physical distribution.

At 520, the processing environment identity service requests verification of the temporary access token from a remote identity service (data center identity service). At 530, the processing environment identity service inspects the processing configuration for the virtual distribution. At this point, the processing environment identity service may request that a PDP service verify the association of the virtual distribution and the physical distribution. In other words, the PDP is asked to ensure the configuration of the virtual distribution is compatible with the known physical distribution configuration (same network constraints, hardware constraints, etc.).

Assuming the configuration for the virtual distribution is in order and that the temporary access token is independently verified, at 540, the processing environment identity service generates and supplies the SP of the virtual distribution with a unique virtual processing environment (virtual distribution) identity.

It may also be the case, at 541 that the processing environment identity service acquires configuration information for applications that are identified in the virtual distributions configuration settings. These can also be verified via a PDP service, and each verified application provided its own unique application identity. At any point if a particular application is not verified, it can be removed, information regarded it logged in a compliance record, and/or reported to other resources.

At 550, the request for a remote policy service (PDP service) is depicted. This is done to verify the association between the virtual distribution and the physical distribution and to acquire policies for the virtual distribution and its applications. These policies can then be enforced by the processing environment identity service or another agent of the physical distribution when the virtual distribution and any of its applications process within the physical distribution.

In another embodiment, at 560, the processing environment identity service may receive second temporary access tokens from the SP of the virtual distribution. These may have originated from an orchestration service, as was discussed above. The processing environment identity service verifies each of these second temporary access tokens with the data center identity service, and when verified supplies unique application identities for the applications to process within the virtual distribution.

So, applications can receive unique identities by being identified and included with the virtual distribution. Alternatively, applications can dynamically receive unique identities on demand when requested by the orchestration service.

In still another embodiment, at 561, the processing environment identity service may generate a signature (hash of some portion) for each application within the virtual distribution in addition to generating the unique identity for each application. The combination of unique identity and signature for each application then permits the processing environment identity service or another agent of the physical distribution to monitor the applications within the virtual distribution as they process.

Accordingly, at 562, the processing environment identity service may monitor each process executing within the virtual distribution for its identity and its signature. If a match is not achieved, the errant process is terminated from processing within the physical distribution and the virtual distribution.

Additionally, at 563, the processing environment identity service may record compliance records for each process executing in the virtual distribution. Each recorded compliance record can note the identity of the physical distribution, the identity of the virtual distribution, and one or more identities associated with the applications noted for that particular compliance record. This provides fine-grain compliance tracking and may even be used to ensure governmental regulations are being satisfied with respect to security.

It is also noted, at 564, that the processing environment identity service may at any time dynamically consult one or more PDP services for new and updated policies, which are used to enforce restrictions on the processing of the physical distribution, the virtual distribution, and the applications executing within the virtual distribution.

Figure 6:
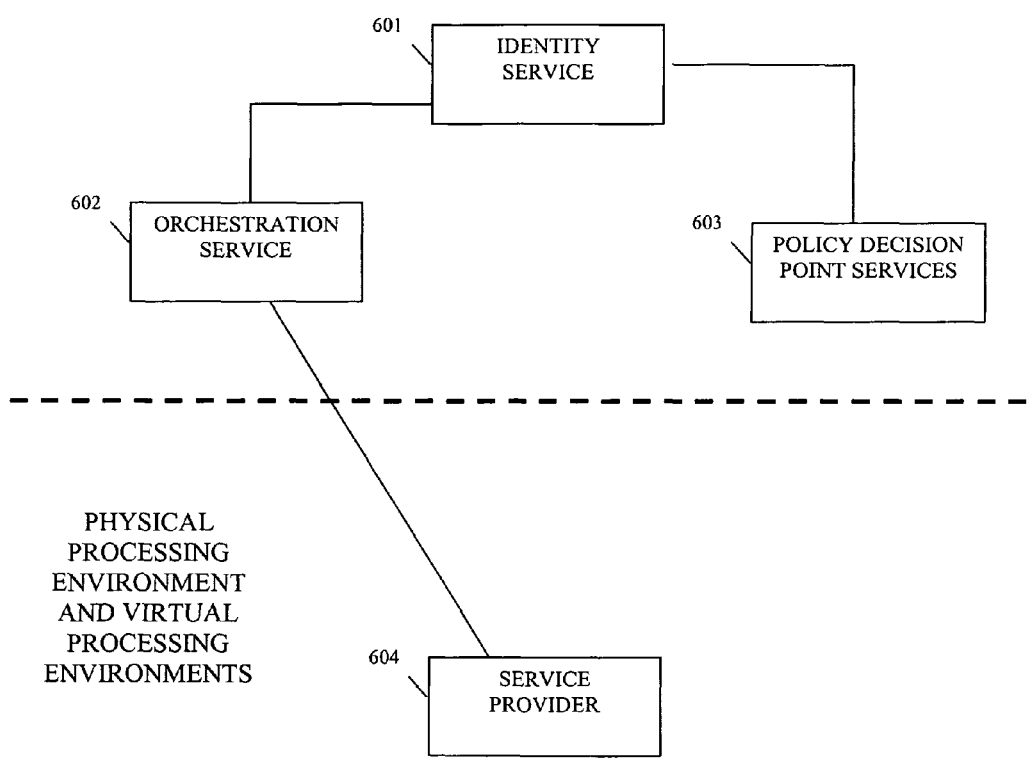
FIG. 6 is a diagram an identity-based virtual data center deployment system, according to an example embodiment.

FIG. 6 is a diagram an identity-based virtual data center deployment system 600, according to an example embodiment. The identity-based virtual data center deployment system 600 is implemented as instructions on or within a machine-accessible and readable medium. The instructions when executed by a machine perform processing depicted with respect to the methods 100, 300, and in some cases 500 of the FIGS. 1, 3, and 5, respectively. The identity-based virtual data center deployment system 600 is also operational over a network and the network may be wired, wireless, or a combination of wired and wireless.

The identity-based virtual data center deployment system 600 includes an identity service 601 and an orchestration service 602. In some cases, the identity-based virtual data center deployment system 600 may also include one or more PDP services 603 and a service provider 604. Each of these will now be discussed in turn.

The identity service 601 represents a data center's identity service and was described in detail above, especially with reference to the methods 100 and 300 and the FIGS. 1-4. The identity service 601 is the conduit though which identities are securely assigned and managed. The identity service 601 is used to assign and establish an identity for physical distributions and the orchestration service 602. Furthermore, the identity service 601 in cooperation with the orchestration service 602 facilitates the assignment of identities to virtual distributions and to applications of those virtual distributions via the distribution and verification of temporary access tokens. A temporary access token is acquired by the orchestration service 602 to establish an identity for a virtual distribution or an application of that virtual distribution. Moreover, a temporary access token is verified for purposes of supplying a permanent identity by a physical distribution's identity service.

The orchestration service 602 was described in detail above with reference to the method 300 and the FIGS. 3-4. The orchestration service 602 uses the identities supplied by the identity service 601 to instantiate, clone, distribute, move, and terminate virtual distributions and applications that process within the virtual distributions. To do this the orchestration service 602 acquires temporary access tokens for resources (virtual distributions and applications and requests for packages of these resources) from the identity service 601.

The temporary access tokens are then supplied to a SP 604 associated with a virtual distribution. The SP 604 locally communicates the temporary access tokens to the physical distribution's identity service. The physical distribution's identity service contacts the identity service 601 to verify them and to acquire policy from the one or more policy decision point services 603. Policy acquired circumscribes processing of the virtual distributions, the physical distribution, and any applications processing within the virtual distributions. Policy may also dictate and verify whether it is permissible for the physical distribution's identity service to supply unique identities to virtual distributions and to applications associated with specific virtual distributions.

The techniques presented herein provide mechanisms for assuring that policy constrains the deployment of virtual distributions on physical distributions. If policy dictates that a virtual distribution has to run on specific conditions (e.g., time of day (temporal constraints), subnet (network constraints), memory or processor capacity (hardware configuration), etc.) then those conditions can be assured (because the identity was established and verified). Note also that because identity is an integral part of functioning within the virtualized data center, that compliance assurance records that are gathered by auditing services may each have the one or more identities associated with those compliance assurance records to provide fine-grain compliance tracking.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   sending, by a local identity service executing on a processor, a data string to a remote identity service executing in a remote processing environment, wherein the data string is randomly generated by the local identity service;
   receiving an encrypted version of the data string from the remote identity service,
      wherein the encrypted version of the data string is created by encrypting the data string using a private key of a secure device located within the remote processing environment, and
      wherein the private key is unknown to the remote identity service;
   decrypting the encrypted version of the data string using a public key of the secure device to authenticate the remote processing environment;
   establishing, after the authentication, a secure channel between the local identity service and the remote identity service based on the remote processing environment being authenticated;
   acquiring operating metadata unique to the remote processing environment via the secure channel, wherein the operating metadata comprises disk subsystem configuration settings for the remote processing environment;
   generating, based upon the operating metadata, a unique identity for the remote processing environment;
   transmitting the unique identity to the remote processing environment;
   installing, in the remote processing environment, a policy enforcement point service;
   enabling a first policy decision point service to transact with the remote processing environment using the unique identity;
   transmitting, by the first policy decision point service, a first policy restriction to the remote processing environment, wherein the policy enforcement point service deploys and enforces the first policy restriction within the remote processing environment;
   acquiring, from a second policy decision point service, a second policy restriction, wherein the second policy restriction initiates the deployment of a virtual processing environment on the remote processing environment; and
   transmitting, to the remote processing environment, the second policy restriction.

2. The method of claim 1, wherein sending the data string to the remote identity service further comprises authenticating the remote identity service before sending the data string as random data for the remote processing environment in order to establish trust with the remote identity service before the data string is sent to the remote identity service.

3. The method of claim 1, wherein acquiring the operating metadata further comprises identifying the operating metadata as one selected from a group consisting of an Internet Protocol (IP) subnet of the remote processing environment and an IP address for the authenticated remote processing environment.

4. The method of claim 3, wherein acquiring the operating metadata further comprises acquiring the operating metadata in an encrypted format encrypted with the private key by the secure device.

5. The method of claim 4, further comprising decrypting the operating metadata in the encrypted format with the public key of the secure device.

6. The method of claim 1, wherein transmitting the unique identity further comprises signing the unique identity, and wherein in response to the remote identity service receiving the unique identity, the remote identity service locally requests that a secure device associated with the remote processing environment sign the unique identity.

7. The method of claim 1 further comprising:
using, by the local identity service, the unique identity, the first policy restriction, and the second policy restriction to perform at least one action selected from a group consisting of cloning the remote virtual processing environment, moving the remote virtual processing environment, and terminating the remote virtual processing environment.

8. The method of claim 1 further comprising:
using, by the local identity service, the unique identity, the first policy restriction, and the second policy restriction to perform at least one action selected from a group consisting of deploying a remote application on the remote virtual processing environment, cloning the remote application on the remote virtual processing environment, moving the remote application on the remote virtual processing environment, and terminating the remote application on the remote virtual processing environment.

* * * * *